(No Model.)

L. JULIG.
BICYCLE.

No. 559,102.  Patented Apr. 28, 1896.

Witnesses,

Inventor,
Leopold Julig
By Dewey & Co.
Attys

UNITED STATES PATENT OFFICE.

LEOPOLD JULIG, OF SAN FRANCISCO, CALIFORNIA.

BICYCLE.

SPECIFICATION forming part of Letters Patent No. 559,102, dated April 28, 1896.

Application filed December 5, 1895. Serial No. 571,119. (No model.)

*To all whom it may concern:*

Be it known that I, LEOPOLD JULIG, a citizen of Germany, residing in the city and county of San Francisco, State of California, have invented an Improvement in Bicycles; and I hereby declare the following to be a full, clear, and exact description of the same.

My invention relates to the general class of bicycles; and it consists in the novel connections which I shall hereinafter fully describe, having for their object the transmission of power from the hands of the rider to assist that derived from his feet.

Figure 1:
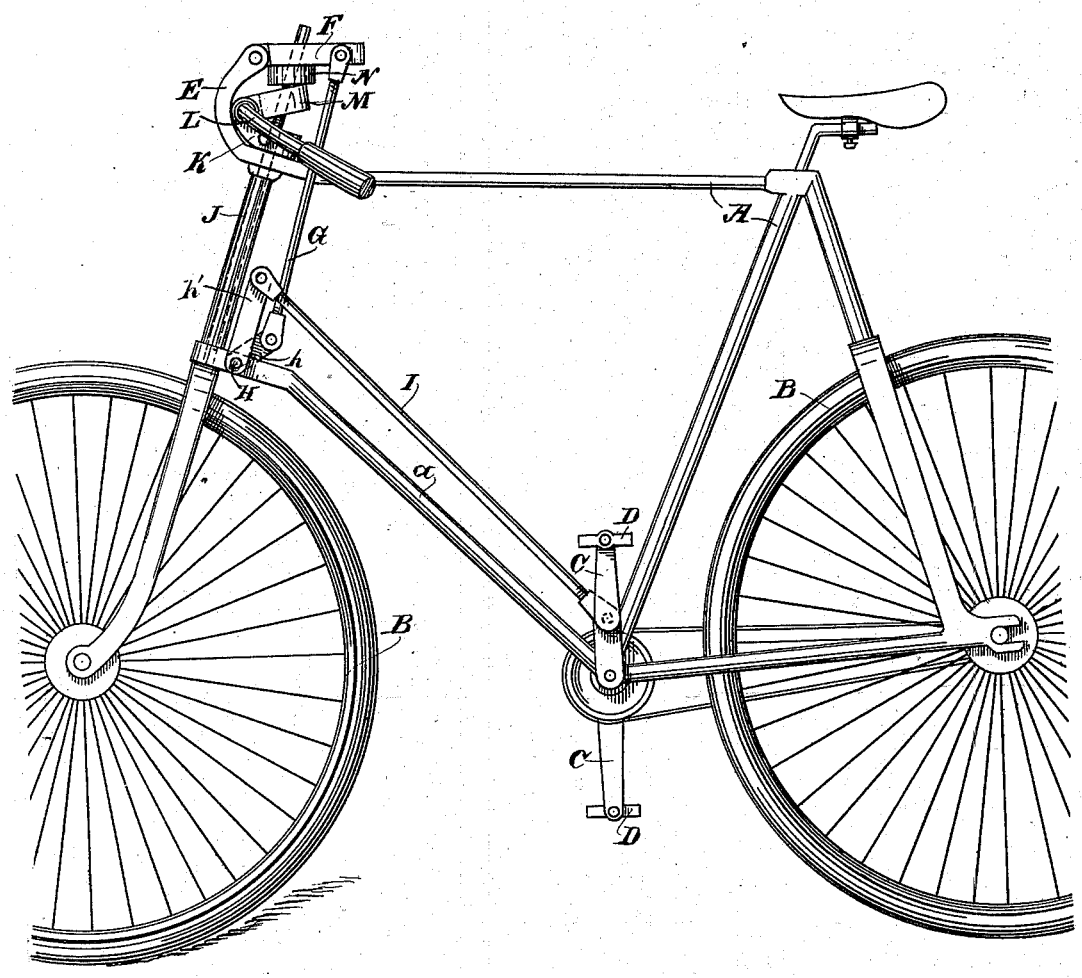
Figure 2:
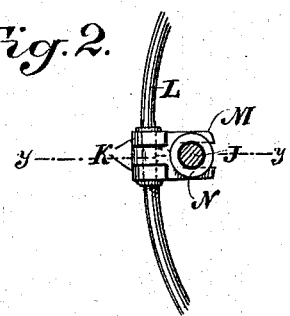
Figure 3:
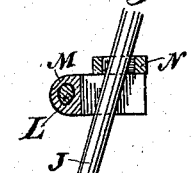

Referring to the accompanying drawings, Figure 1 is a side elevation of my bicycle. Fig. 2 is a top view of the connection between the handle-bar and the lever M. Fig. 3 is a section on line $y\ y$ of Fig. 2.

A represents the frame generally of the machine; B, the wheels; C, the cranks, and D the pedals.

E is an upright bracket extending from the head of the machine and formed or connected suitably therewith. In the upper extremity of this bracket is pivoted a lever F, to the inner end of which is pivoted a connecting-rod G, which extends downwardly and is connected at its lower end to a short crank $h$ on a rock-shaft H, which is journaled in the upper end of the diagonal bar $a$ of the frame. The end of this rock-shaft is provided with a crank $h'$, to which is connected a rod I, the lower end of which is connected with one of the cranks C of the machine.

J is the pivotal or steering stem of the front-wheel fork. To this stem is connected a bracket K, in the upturned arms of which is journaled the handle-bar L of the machine. Between the arms of the bracket is fitted the end of a lifting-lever M, said end being rigidly connected with the handle-bar, so that when said handle-bar is rocked or oscillated axially the lifting-lever M will be raised and lowered. This connection between the lifting-lever and the handle-bar may be of any suitable rigid character, and for the sake of simplicity I have here shown it as being formed by a somewhat oval cross-section of the handle-bar center fitting in a corresponding hole in the lever. It may be well at this point to state that a similar connection is formed between the rock-shaft H and its short crank $h$.

The lever M plays freely over the pivotal steering-stem J and is adapted by its rise to lift the lever F and by its fall to allow the return of said lever.

In order to reduce the friction and to make a proper contact between the two levers, I interpose a freely-movable ring or washer N upon the pivotal stem J.

The operation of this mechanism is as follows: When the rider is proceeding with the power of his feet alone, the lever F simply rises and falls without interfering or being interfered with, and the handle-bar is gripped in the usual manner and the steering is effected as is customary. When, however, the rider desires to assist by his hands—as, for example, when going up a hill—he has but to lift up on the handle-bar at the time when the lever F is depressed, and by so lifting he raises the lever M, which, through the intervening washer or ring N, bears up under the lever F, and this lifting force is applied to the uprising pedal-crank, thereby assisting on this side the power of the foot on the down-moving pedal-crank of the other side. Then returning the handles to the initial point he again lifts them for a repetition of the operation.

In the ordinary position of the handle-bar the lever M rests upon the bracket K, and said handle-bar is thus rendered rigid to downward pressure and is used as is customary. By this mechanism the hands may assist the feet whenever desired, and at other times the machine may be propelled as ordinarily. At the same time the steering may be effected as usual.

Having thus described my invention, what I claim as new, and desire to secure by Letters Patent, is—

1. In a bicycle, power-transmitting mechanisms consisting of a pivoted lever at the head of the machine, connecting devices between said lever and the pedal-crank, a handle-bar mounted in the head of the machine and adapted to be turned axially, and connections normally out of engagement with said lever and adapted to be brought into contact therewith whereby the axial movement of the handle-bar operates the pivoted lever.

2. In a bicycle, power-transmitting mechanism consisting of a pivoted lever at the head of the machine, connecting devices between said lever and the pedal-crank, a handle-bar mounted in the head of the machine and adapted to axially oscillate, and a lifting-lever on the handle-bar for operating the pivoted lever, said lifting-lever having no fixed connection with the pivoted lever whereby the machine may be propelled by the pedal-cranks independent of the handle-bar.

3. In a bicycle, power-transmitting mechanism consisting of a pivoted lever at the head of the machine, connecting devices between said lever and the pedal-crank, a handle-bar mounted in the head of the machine and adapted to axially oscillate, a lifting-lever on the handle-bar operating below the pivoted lever and having no fixed connection with said pivoted lever, and an intervening ring or washer between the two levers.

4. In a bicycle, a mechanism for transmitting the power of the hands to the pedal-crank, consisting of a lever pivoted at the head of a machine, a connecting-rod extending downwardly from said lever, a rock-shaft in the frame of the machine below and having a crank with which said connecting-rod is joined, a second crank of said rock-shaft, a rod connecting said crank with the pedal-crank of the machine, a handle-bar adapted to oscillate, and means whereby the oscillation of the handle-bar is caused to alternately lift and disengage the pivoted lever.

5. In a bicycle, a mechanism for transmitting the power of the hands to the pedal-crank, consisting of a lever pivoted at the head of a machine, a connecting-rod extending downwardly from said lever, a rock-shaft in the frame of the machine below, and having a crank with which said connecting-rod is joined, a second crank of said rock-shaft, a rod connecting said crank with the pedal-crank of the machine, a handle-bar adapted to oscillate, a lifting-lever secured to the handle-bar and having its outer end free to move in vertical planes independent of the pivoted lever and a ring or washer between the lifting-lever and the pivoted lever.

6. In a bicycle, the means for transmitting the power of the hands to the pedal-crank of the machine consisting of a lever pivoted to a bracket on the head of the machine, a rock-shaft with cranks journaled in the frame of the machine below, connecting-rods joining the pivoted lever and rock-shaft and the rock-shaft and the pedal-crank of the machine, a bracket rigidly secured to the steering-stem of the front-wheel fork, a handle-bar journaled and adapted to oscillate in said bracket and a lever rigidly connected with said handle-bar and having its outer end free to move in vertical planes independent of the pivoted lever and adapted to operate the pivoted lever.

7. In a bicycle, the means for transmitting the power of the hands to the pedal-crank of the machine consisting of a lever pivoted to a bracket on the head of the machine, a rock-shaft with cranks journaled in the frame of the machine below, connecting-rods joining the lever and rock-shaft and the rock-shaft and the pedal-crank of the machine, a bracket rigidly secured to the steering-stem of the front-wheel fork, a handle-bar journaled and adapted to oscillate in said bracket, a lever rigidly connected with said handle-bar and adapted to operate the lever and a ring or washer loosely fitted upon the steering-stem between the free end of the lifting-lever and under side of the pivoted lever.

In witness whereof I have hereunto set my hand.

LEOPOLD JULIG.

Witnesses:
S. H. NOURSE,
WM. F. BOOTH.